United States Patent
Artieri et al.

(10) Patent No.: US 9,734,070 B2
(45) Date of Patent: Aug. 15, 2017

(54) SYSTEM AND METHOD FOR A SHARED CACHE WITH ADAPTIVE PARTITIONING

(71) Applicant: QUALCOMM INCORPORATED, San Diego, CA (US)

(72) Inventors: Alain Artieri, San Diego, CA (US); Subbarao Palacharla, San Diego, CA (US); Laurent Moll, San Jose, CA (US); Raghu Sankuratri, San Diego, CA (US); Kedar Bhole, San Diego, CA (US); Vinod Chamarty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/921,468

(22) Filed: Oct. 23, 2015

(65) Prior Publication Data

US 2017/0116118 A1 Apr. 27, 2017

(51) Int. Cl.
*G06F 12/08* (2016.01)
*G06F 12/084* (2016.01)
(Continued)

(52) U.S. Cl.
CPC ........ *G06F 12/084* (2013.01); *G06F 12/0842* (2013.01); *G06F 12/0846* (2013.01);
(Continued)

(58) Field of Classification Search
CPC ............. G06F 12/0806; G06F 12/0808; G06F 12/0815; G06F 12/084; G06F 12/0842;
(Continued)

(56) References Cited

U.S. PATENT DOCUMENTS

| | | | |
|---|---|---|---|
| 6,591,347 B2 * | 7/2003 | Tischler | G06F 12/121 |
| | | | 711/128 |
| 8,606,999 B2 | 12/2013 | Donley et al. | |
| 9,529,719 B2 * | 12/2016 | Walker | G06F 12/084 |
| 2007/0143546 A1 * | 6/2007 | Narad | G06F 12/084 |
| | | | 711/130 |
| 2008/0235457 A1 * | 9/2008 | Hasenplaugh | G06F 12/0842 |
| | | | 711/130 |
| 2011/0010503 A1 | 1/2011 | Yamamura et al. | |
| 2012/0144118 A1 | 6/2012 | Tsien et al. | |

(Continued)

FOREIGN PATENT DOCUMENTS

CN 103699497 A 4/2014

OTHER PUBLICATIONS

Seznec, A Case for Two-Way Skewed-Associative Caches, Proceedings of the 20th International Symposium on Computer Architecture, May 1993, pp. 1-20, IEEE, San Diego, CA, USA.
(Continued)

*Primary Examiner* — Hiep Nguyen
(74) *Attorney, Agent, or Firm* — Smith Tempel Blaha LLC

(57) ABSTRACT

A cache controller adaptively partitions a shared cache. The adaptive partitioning cache controller includes tag comparison and staling logic and selection logic that are responsive to client access requests and various parameters. A component cache is assigned a target occupancy which is compared to a current occupancy. A conditional identification of stale cache lines is used to manage data stored in the shared cache. When a conflict or cache miss is identified, selection logic identifies candidates for replacement preferably among cache lines identified as stale. Each cache line is assigned to a bucket with a fixed number of buckets per component cache. Allocated cache lines are assigned to a bucket as a function of the target occupancy. After a select number of buckets are filled, subsequent allocations result in the oldest cache lines being marked stale. Cache lines are deemed stale when their respective component cache active indicator is de-asserted.

30 Claims, 12 Drawing Sheets

(51) Int. Cl.
*G06F 12/0895* (2016.01)
*G06F 12/0842* (2016.01)
*G06F 12/0846* (2016.01)
*G06F 12/127* (2016.01)
*G06F 12/0864* (2016.01)
*G06F 12/123* (2016.01)

(52) U.S. Cl.
CPC ........ *G06F 12/0895* (2013.01); *G06F 12/127* (2013.01); *G06F 12/0864* (2013.01); *G06F 12/123* (2013.01); *G06F 2212/1044* (2013.01); *G06F 2212/1048* (2013.01); *G06F 2212/601* (2013.01); *G06F 2212/62* (2013.01)

(58) Field of Classification Search
CPC ............. G06F 12/0844; G06F 12/0871; G06F 12/0895; G06F 12/0846; G06F 12/0864; G06F 12/123; G06F 12/127; G06F 2212/1048; G06F 2212/601; G06F 2212/62; G06F 2212/1044
See application file for complete search history.

(56) References Cited

U.S. PATENT DOCUMENTS

2012/0166729 A1 6/2012 Donley
2013/0097387 A1 4/2013 Sanchez Martin et al.
2015/0089152 A1 3/2015 Busaba et al.

OTHER PUBLICATIONS

International Search Report and Written Opinion—PCT/US2016/053082—ISA/EPO—dated Jan. 30, 2017.
Partial International Search Report and Written Opinion—PCT/US2016/053082—ISA/EPO—dated Dec. 2, 2016.
Zang W., et al., "A Survey on Cache Tuning from a Power/Energy Perspective", ACM Computing Surveys, ACM, New York, NY, US, vol. 45, No. 3, Jul. 3, 2013, XP058020918, pp. 1-49.

* cited by examiner

SYSTEM AND METHOD FOR A SHARED CACHE WITH ADAPTIVE PARTITIONING

DESCRIPTION OF THE RELATED ART

Cache partitioning to serve multiple client processes or client applications ("clients") in computing systems has several benefits. Partition size can vary to match performance requirements of the client. Clients experience robust performance since data in its private cache is not subject to evictions due to accesses initiated by other clients.

However, these benefits are not as great as they could be due to limitations imposed by the way current cache partitioning is accomplished. Some conventional designs for computing devices include multiple processors of different types (such as, a central processing unit, graphics processing unit, display controller, hardware accelerators, etc.) and/or processors with multiple cores to support the various primary and peripheral functions desired for a particular computing device. Such designs often further integrate analog, digital, and radio-frequency circuits or other specialized circuits to enable specific functions on a single silicon substrate and are commonly referred to as a system on a chip (SoC).

Currently caches may be partitioned across cache ways only or using a combination of both way and set partitioning, which options are both limited. When way only partitioning is implemented, the cache partition number is limited by the number of cache ways, and adding associativity to the cache partitions to reduce cache conflicts reduces the maximum number of cache partitions possible. Minimum way partition size is determined by the associativity. For example, the smallest partition for an 8 MB cache with 8 ways that is 8-way associative is 1 MB. Also, enabling the use of smaller cache partitions could result in loss of cache space. Using the same example, 512 KB of data stored in the smallest 1 MB cache partition would result in 512 KB of unused space in the cache partition.

Set partitioning maintains a high associativity and provides greater flexibility but creates a data coherency management issue that may require complex solutions to successfully manage as resizing a cache in the set dimension is not a trivial task. Set partitioning works with baseline set associative caches. However, set partitioning does not work with skewed associative cache structures.

Way partitioning is illustrated in FIG. 1. Cache store 1 includes an array of addressable memory segments separately addressable by N Ways and M Sets, where N and M are positive integers. As further indicated in FIG. 1, cache store 1 includes 8 Ways and 8 Sets and is segmented into cache partitions 2, 3 and 4 with cache partition 2 including a capacity of 4×8 addressable segments, cache partition 3 including 2×8 addressable segments and cache partition 4 including 2×8 addressable segments.

Set & Way partitioning is illustrated in FIG. 2. Cache store 5 includes an array of addressable memory segments separately addressable by N Ways and M Sets, where N and M are positive integers. As further indicated in FIG. 2, cache store 5 includes 8 Ways and 8 Sets and is segmented into cache partitions 6, 7 and 8 with cache partition 6 including a capacity of 4×4 addressable segments, cache partition 7 including 2×1 addressable segments and cache partition 8 including 1×8 addressable segments.

The effectiveness of a combined set/way partitioning scheme is questionable beyond a relatively small number of coarse grain and highly customized solutions. The complicated geometrical representations in a set/way partitioned cache must be manipulated and managed over time when creating, deleting, and resizing component caches. Consequently, set/way partitioning methodologies are not scalable.

Thus, there is a need for improved mechanisms for dynamically managing cache partitions.

SUMMARY OF THE DISCLOSURE

Alternative embodiments of computing systems and methods for adaptively partitioning a shared cache are disclosed. Example embodiments illustrate hardware elements including storage registers, interconnections, and logic circuits in an improved cache controller that may be deployed in a computing device.

Another example embodiment includes a computing device. The computing device includes a processor, a shared cache, and a shared or adaptive partitioning cache controller. The shared cache provides a data storage resource for the processor. The adaptive partitioning cache controller is communicatively coupled to the processor and the shared cache. The adaptive partitioning cache controller includes an input port, registers, one tag comparison and staling logic module per way and a selection logic module. The input port receives access requests from a client executing on or in communication with the computer device. The registers provide data storage for operational parameters for a desired number of component caches or segments of the shared cache. The tag comparison and staling logic is coupled to the registers and is arranged to generate a measure of the elapsed time that information has been stored in a particular cache line in the shared cache, record a stale condition, and conditionally update a bucket pointer. The selection logic is coupled to the tag comparison and staling logic and the registers. The selection logic arranged to conditionally identify a replacement candidate to be replaced in the shared cache.

Another example embodiment is a method for adaptively partitioning a shared cache. The method comprises the steps of storing parameters that define aspects of an integer number of component caches in the shared cache, wherein at least one of the integer number of component caches is associated to a set of parameters including a target occupancy and an occupancy counter; applying, to client requests, a unique identifier corresponding to a component cache within the integer number of component caches; in response to client requests to store client data in the shared cache, using information stored in the set of parameters to make cache line allocations, wherein when a cache line is allocated an associated occupancy counter is incremented; and using the information stored in the set of parameters to identify candidate cache lines for eviction, wherein when a cache line is evicted the associated occupancy counter is decremented.

In another embodiment, an adaptive partitioning controller includes registers, tag comparison and staling logic and selection logic. The registers store operational parameters for a desired number of component caches within a shared cache. The tag comparison and staling logic is coupled to the registers and receives a cache address and a unique component cache identifier that identifies a cache line in the shared cache. In response to an operational mode input, the tag comparison and staling logic generates a measure of the elapsed time that information has been stored in a particular cache line in the shared cache, conditionally records a stale condition, a valid condition and updates a bucket pointer. The selection logic is coupled to the tag comparison and staling logic and to the registers. The selection logic is arranged to receive the measure of the elapsed time that the information has been stored in the particular cache line in the shared cache, the component cache identifier, and a priority indicator. The selection logic identifies a candidate cache line to be replaced in the shared cache in accordance with the stale condition, a valid condition and the component cache identifier.

In an alternative embodiment portions of the novel cache controller and methods may be enabled by a non-transitory processor-readable medium having stored thereon processor-executable instructions that when executed direct a processor and an adaptive partitioning cache controller to perform operations. The operations include defining configuration parameters, occupancy parameters and time related parameters including a unique identifier, a target occupancy, an occupancy counter and an integer number of bucket pointers, identifying a shared cache access request from a client application, generating a measure of the elapsed time that information has been stored in a particular cache line in a system cache, recording a stale condition, conditionally updating a bucket pointer and conditionally identifying a replacement candidate to be replaced in the system cache.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the novel systems and methods.

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
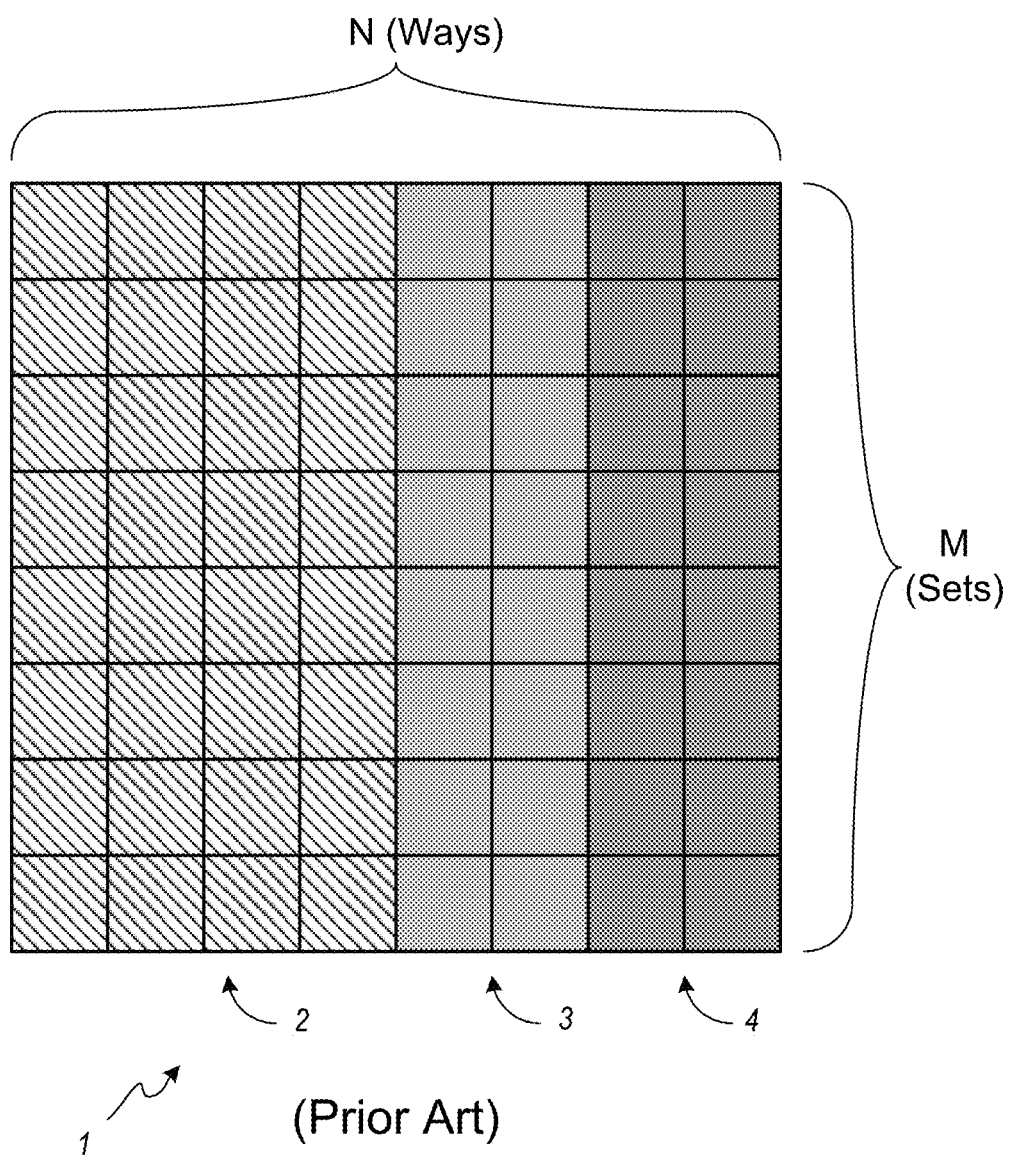
FIG. 1 is a schematic diagram illustrating conventional Way partitioning of a shared cache.
Figure 2:
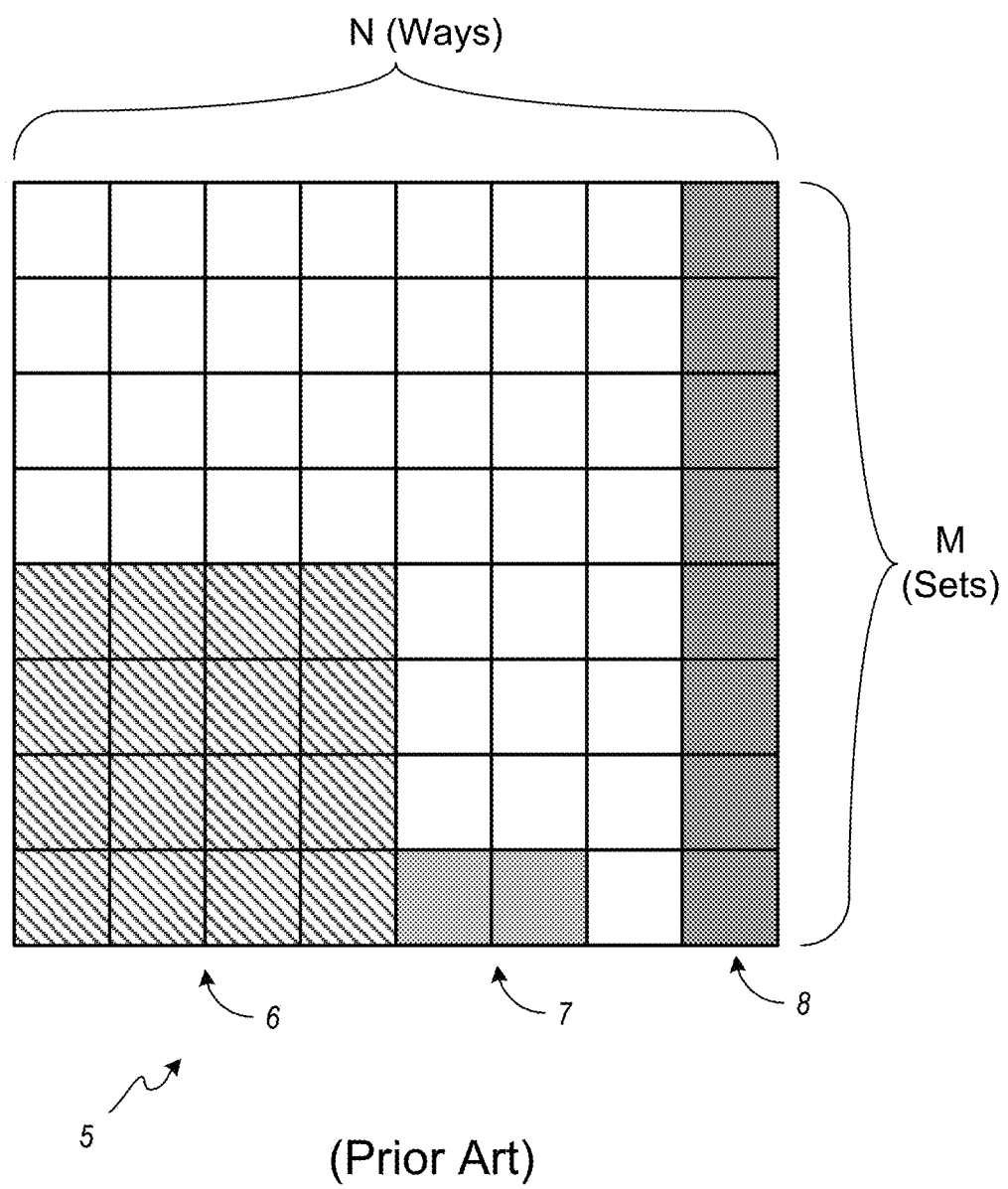
FIG. 2 is a schematic diagram illustrating conventional Set & Way partitioning of a shared cache.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the inventive system and methods or the claims.

The terms "computing device" and "mobile device" are used interchangeably herein to refer to any one or all of cellular telephones, smartphones, personal or mobile multi-media players, personal data assistants (PDAs), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a programmable processor.

While the various aspects are particularly useful for mobile computing devices, such as smartphones, which have limited energy resources, the aspects are generally useful in any electronic device that implements a plurality of memory devices and where energy efficiency is a concern. Accordingly, the adaptive partitioning cache controller and methods can be applied in computing devices arranged in desktop and rack-mounted form factors, which generally use batteries only when other power sources are unavailable.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The term "content" is used herein to describe files having executable content, such as: object code, scripts, byte code, markup language files, and patches. In addition, "content"

referred to herein, may also include files that are not executable in nature, such as data files or data values that need to be accessed.

As used in this description, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various processor-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The term "adaptive," as used in the description, describes and includes a cache that may grow beyond a target occupancy when there is no concurrency between multiple clients but will stay close to the target occupancy in the presence of concurrent use between multiple clients. The adaptive partitioning cache controller will guaranty a minimum occupancy for each component cache whatever the relative concurrency. In addition, the component cache can opportunistically occupy additional storage space when concurrency is low resulting in increased performance. Accordingly, in some embodiments the adaptive partitioning cache controller can enable better performance by dynamically adjusting the component cache parameters absent software overhead and intervention.

An example embodiment includes an adaptive partitioning cache controller. The adaptive partitioning cache controller includes registers, tag comparison and staling logic modules and a victim selection logic module. There is one tag comparison and staling logic module per way. The registers are arranged to store a set of operational parameters for a desired number of component caches of a shared cache. Each status logic module is communicatively coupled to the registers and arranged to receive a cache address, a unique component cache identifier and optionally a specific attribute associated to the transaction presented to the cache. Each tag comparison and staling logic module in response to a current bucket pointer, overflow bit, active bit, priority level, and a replacement policy mode generates a measure of the elapsed time that information has been stored in a particular cache line in the shared cache, records a stale condition and conditionally updates the bucket pointer according to the replacement policy mode. Under certain conditions an identified component cache is permitted to exceed a respective assigned target occupancy. The victim selection logic is communicatively coupled to the tag comparison and staling logic module(s) and the registers. The victim selection logic is arranged to receive in parallel from each tag comparison and staling logic module the measure of the elapsed time that information has been stored in a particular cache line in the shared cache, the component cache identifier, priority level, stale and valid conditions, and identify, in accordance with the victim selection algorithm, a candidate cache line to be replaced in the shared cache. The selection algorithm will select in priority a non-valid candidate, otherwise a stale candidate, otherwise a lower priority candidate, otherwise the oldest candidate with the same component cache identifier otherwise no victim is selected.

Figure 3:
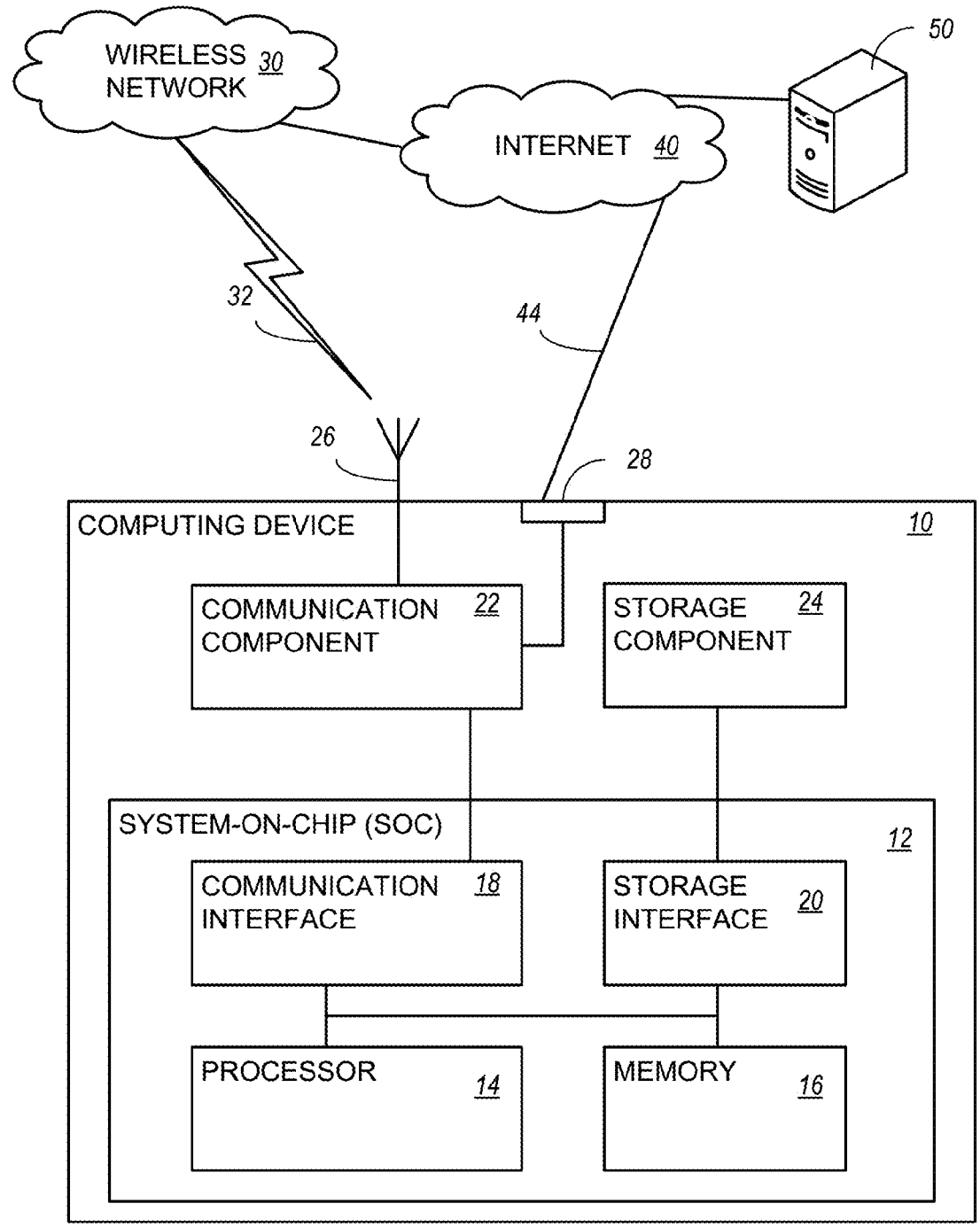
FIG. 3 is a functional block illustrating an example embodiment of a computing environment including a computing device suitable for implementing an improved cache controller.

FIG. 3 illustrates a system including a computing device 10 in communication with a remote computer 50 suitable for use with the various aspects. The computing device 10 includes a SoC 12 with a processor 14, a memory 16, a communication interface 18, and a storage interface 20. The computing device 10 further includes a communication component 22 such as a wired or wireless modem, a storage component 24, an antenna 26 for establishing a wireless connection 32 to a wireless network 30, and/or the network interface 28 for connecting to a wired connection 44 to the Internet 40. The processor 14 may include any of a variety of hardware cores, as well as a number of processor cores. The computing device 10 may also include one or more processors 14 and two or more SoCs 12, thereby increasing the number of processors 14 and processor cores. The computing device 10 may include separate processor cores 14 that are not associated with a SoC 12. Individual processors 14 may be multi-core processors as described below with reference to FIG. 4. The processors 14 may each be configured for specific purposes that may be the same as or different from other processors 14 of the computing device 10. One or more of the processors 14 and processor cores of the same or different configurations may be grouped together as part of one or more subsystems of the computing device 10 as described below with reference to FIG. 5.

The memory 16 of the SoC 12 may be a volatile or non-volatile memory configured for storing data and processor-executable code for access by the processor 14. In an aspect, the memory 16 may be configured to store data structures at least temporarily, such as a table for managing component caches of a cache memory adaptively partitioned as described below. As discussed in further detail below, each of the processor cores may access a variety of component caches of a cache memory.

The computing device 10 and/or SoC 12 may include one or more memories 16 configured for various purposes. In an aspect, one or more memories 16 may be configured to be dedicated to storing the data structures for storing component cache information in a manner that enables the data structure information to be accessed for managing component cache access requests by the processors 14. When the memory 16 storing the data structures is non-volatile, the memory 16 may retain the information of the data structures even after the power of the computing device 10 has been shut off. When the power is turned back on and the computing device 10 reboots, the information of the data structures stored in non-volatile memory 16 may be available to the computing device 10.

The communication interface 18, communication component 22, antenna 26 and/or network interface 28, may work in unison to enable the computing device 10 to communicate over a wireless network 30 via a wireless connection 32, and/or a wired network connection 44 and nodes on the Internet 40 including the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the data structures, such that information stored in the data structures may be accessed by one or more processors 14. The storage component 24, being non-volatile, may retain the stored information even after the power of the computing device 10 has been shut off. When the power is turned back on and the computing device 10 reboots, the information stored in the storage component 24 may be available to the computing device 10. The storage interface 20 may control access to the storage component 24 and allow the processor 14 to read data from and write data to the storage component 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 4:
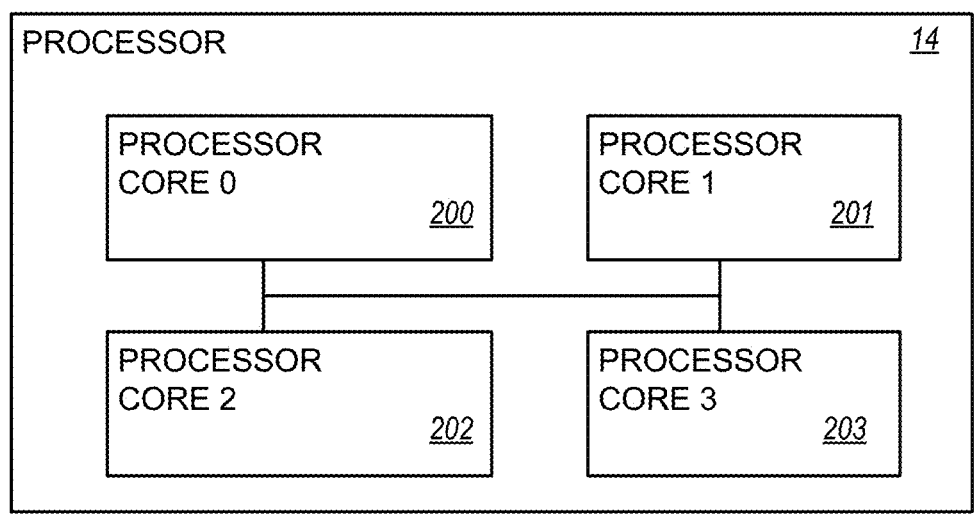
FIG. 4 is a schematic diagram illustrating an example embodiment of a multi-core processor that may be implemented in the computing device of FIG. 3.

FIG. 4 illustrates a multi-core processor 14 suitable for implementing an aspect. The multi-core processor 14 may have a plurality of equivalent processor cores 200, 201, 202, 203. The processor cores 200, 201, 202, 203 may be equivalent in that, the processor cores 200, 201, 202, 203 of a single processor 14 may be configured for the same purpose and have the same or similar performance characteristics. For example, the processor 14 may be a general-purpose processor, and the processor cores 200, 201, 202, 203 may be equivalent general-purpose processor cores. Alternatively, the processor 14 may be a GPU or a DSP, and the processor cores 200, 201, 202, 203 may be equivalent GPU cores or DSP cores, respectively. Through variations in the manufacturing process and materials, the performance characteristics of the processor cores 200, 201, 202, 203 may differ from processor core to processor core within the same multicore processor 14 or within another multi-core processor 14 using the same designed processor cores.

In the example illustrated in FIG. 4, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 4. However, it should be noted that the four processor cores 200, 201, 202, 203 illustrated in FIG. 4 and described herein are merely provided as an example and in no way are meant to be limiting. The computing device 10, the SoC 12, or the multi-core processor 14 may individually or in combination include fewer or more than the four processor cores 200, 201, 202, 203 illustrated and described herein.

Figure 5:
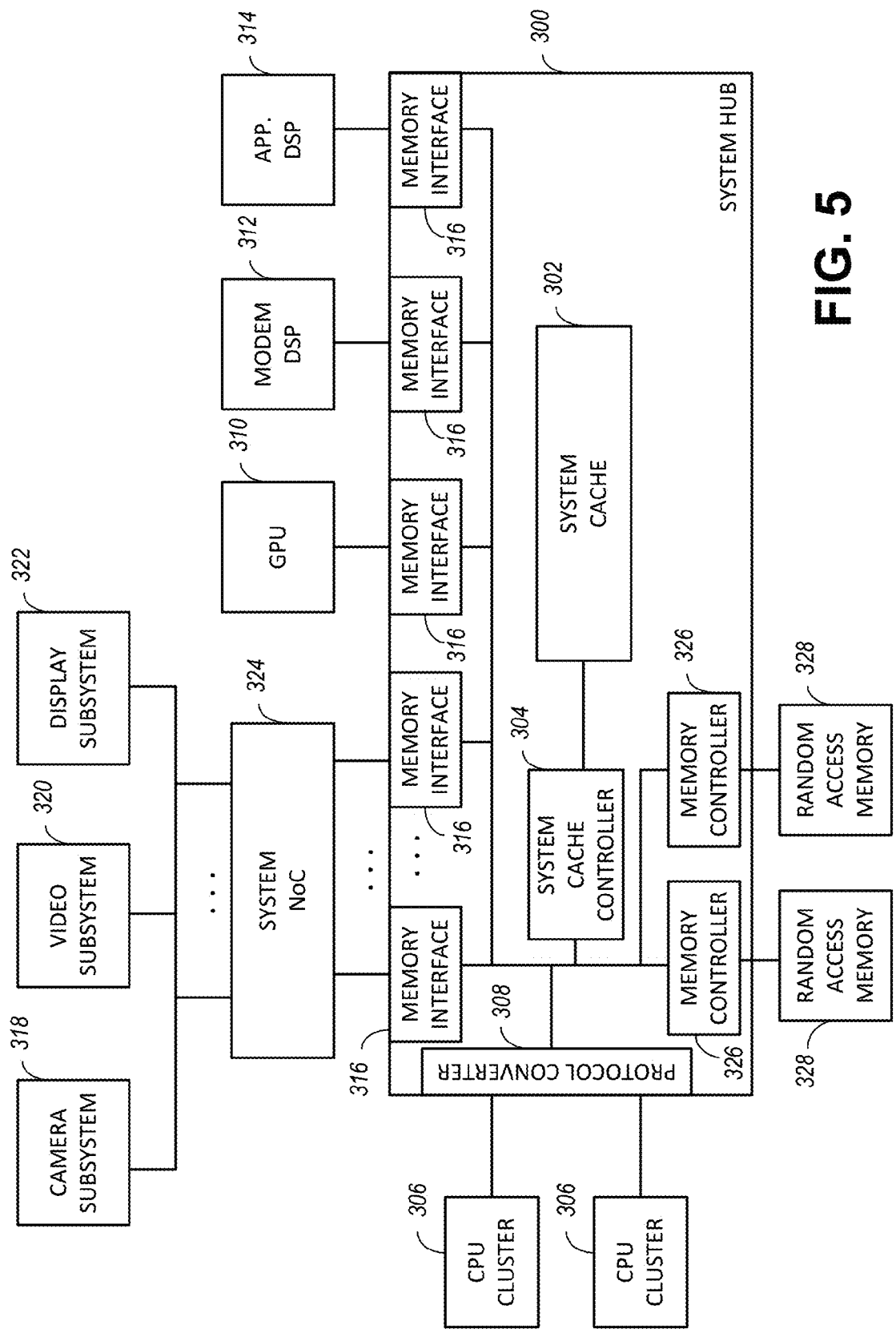
FIG. 5 is a schematic diagram illustrating an example embodiment of the system-on-chip of FIG. 3.

FIG. 5 illustrates a SoC 12 configured to partition cache memory into component caches in a self-adaptive manner. The SoC 12 may include a variety of components as described above. Some such components and additional components may be employed to implement the component caches. For example, a SoC 12 configured to implement component caches may include a system hub 300, a system cache 302, a system cache controller 304, a CPU cluster 306, a protocol converter 308, a GPU 310, a modem DSP 312, an application DSP 314, a memory interface 316, a camera subsystem 318, a video subsystem 320, a display subsystem 322, a system network on chip (NoC) 324, a memory controller 326, and a random access memory (RAM) 328.

The system hub 300 is a component of the SoC 12 that manages access to the various memories by the CPU cluster 306 via the protocol converter 308, as well as, GPU 310, modem DSP 312, and application DSP 314. As illustrated in FIG. 5, the system hub 300 further manages access to the various memory devices by camera subsystem 318, video subsystem 320 and display subsystem 322 via the system NoC 324. Each of the subsystems can access the system cache 302 via various paths established through the system NoC 324, the memory interface 316 and system cache controller 324. Multiple instances of RAM 328 are coupled to the system cache 302 via memory controller 326 and the system cache controller 324. Similarly, each of the GPU 310, modem DSP 312 and application DSP 314 can access the system cache 302 via memory interface 316 and the system cache controller 324. In an aspect the system hub 300 may manage accesses to the system cache 302 of the SoC 12 and also to the RAM 328. Some of the processors that may access the various memories may be included in the CPU clusters 306 and the various subsystems, such as the camera subsystem 318, video subsystem 320, and display subsystem 322, and may also include other specialized processors such as the GPU 310, the modem DSP 312, and the application DSP 314.

The system cache 302 may be a shared memory device in the SoC 12 used to replace or supplement cache memories that may be associated with the various processors and/or subsystems. The system cache 302 may centralize the cache memory resources of the SoC 12 so that the various processors and subsystems may access the system cache 302 to read and write program commands and data designated for repeated and/or quick access. The system cache 302 may store data from the various processors and subsystems, and also from other memory devices of the computing device, such as a main memory (not shown), the RAM 328, or other storage devices (e.g., a solid-state memory module, a hard disk drive). In an aspect, the system cache 302 may be backed up by such memory and storage devices in case a cache miss occurs because an item requested from the system cache 302 cannot be located. In an aspect, the system cache 302 may be used as scratchpad memory for the various processors and subsystems. The system cache 302 may be smaller in storage space and physical size than a combination of the local cache memories of a SoC of similar architecture that does not employ a system cache 302. However, management of the system cache 302 as described further herein may allow for greater energy conservation and equal or better performance speed of the SoC 12 despite the system cache's smaller storage space and physical size.

The system cache 302 is logically managed in partitions referred to as component caches. Each component cache contains a limited set of cache lines associated with each other by a component cache identifier. A process or thread active on the computing device 10 may identify the component cache when communicating with the system cache controller 304. Cache transactions that are received by the system cache controller 304 without a component cache identifier, such as those issued by a CPU, may be assigned to the same component cache by using a default component cache identifier for all such transactions.

After activation of a component cache, cache lines belonging to the component cache are allocated on an as needed basis in accordance with the present workloads on the computing device 10. The system cache controller 304 keeps track of component cache use or occupancy by a count of the cache lines allocated to the component cache. The cache controller 304 applies or assigns a target occupancy for the component cache as an integer number of cache lines. A respective target occupancy is stored in a register for use by the system cache controller 304. When a component cache exceeds the target occupancy, the component cache is in an overflowed state. The component cache may continue to grow by adding additional cache lines to the component cache but the oldest cache lines stored in the component cache are marked stale. Thus, an overflowed component cache will have at least two parts: a fresh part and a stale part. Under some conditions, even the fresh part may exceed the target occupancy.

The identification of stale cache lines or staling process is used by a replacement policy to identify candidate cache lines for removal from a component cache. The replacement policy is applied by the system cache controller 304 when a conflict miss occurs in response to a cache allocation request.

The system cache controller 304 and methods for adaptively partitioning the system cache 302 assign each cache line to a group referred to as a bucket. A fixed number of buckets are assigned to a component cache. For the purposes of illustration and explanation, the integer 16 is used. It should be understood that the number of buckets may be less than or greater than 16, which selection may be based on expected workloads of the computing device 10 or in accordance with other criteria. Unique bucket pointers are assigned to the 16 buckets. In an example embodiment, bucket pointers are identified by the numbers 0 to 15, which can be represented by 4 bits. This is a low number of bits compared to prior art where a coarse time stamp may be used. In such prior art, a much larger number of bits must be used to reduce the occurrence of age miss calculation due to aliasing. The present circuits and modules use a new mechanism based on a stale bit condition to achieve the same goal in a significantly lower hardware cost.

An example method for adaptively partitioning a shared cache further includes the steps of assigning a bucket pointer and a bucket level counter to at least one of the integer number of component caches, which is logically divided into an integer number of buckets. For cache line allocation operations that address a particular component cache, a bucket level value in the bucket level counter assigned to the particular component cache is incremented. When the bucket level value reaches a fixed fraction of a target occupancy for the respective component cache, the bucket pointer is incremented and the bucket level counter is reset. The bucket pointer associated with an allocated cache line is stored in the shared cache.

In addition, for access operations that address the respective component cache, the system cache controller 304 identifies a set of candidate cache lines for replacement and for the set of candidate cache lines calculates a respective age by comparing a value in the bucket pointer associated with the candidate cache line with a current bucket value for the respective component cache. The system cache controller 304 determines a stale bit condition depending on the respective age and stores the stale bit condition in the shared cache. The set of parameters associated with a respective component cache includes a least recently used parameter that conditionally identifies when a cache line from an older bucket should be moved to a current bucket. When a cache line is moved from an older bucket to a current bucket, the system cache controller 304 sets or asserts a refresh bit. For a component cache access operation that results in a hit condition, the system cache controller 304 conditionally updates the bucket pointer, a stale bit condition, and the bucket level value for the respective component cache. When the least recently used parameter is set or asserted and the bucket pointer is not equal to the component cache current bucket pointer, the bucket pointer is refreshed, the stale bit condition is reset or de-asserted and the bucket level value is incremented.

For a component cache access operation that results in a miss condition, the system cache controller 304 conditionally identifies a replacement candidate. More specifically, the system cache controller 304 assigns a priority parameter to a component cache and conditionally identifies the replacement candidate when no stale candidates exist. The replacement candidate is selected in a preferred sequence including from among stale cache lines, from a lowest priority cache line with a lower or equal priority than an incoming cache line and when multiple fresh replacement candidates are identified from an oldest cache line present in the shared cache. When multiple replacement candidates are identified, the system cache controller 304 applies an alternative replacement candidate identification criteria. In one example embodiment, the alternative replacement candidate criteria includes identifying a default way in the shared cache 302. The system cache controller 304 also assigns an optional allocate parameter to the respective component caches in the shared cache 302 and conditionally allocates a cache line when the identified component cache is not full. Alternatively, the system cache controller 304 does not allocate a cache line when the respective component cache is full and the optional allocate parameter is set or asserted.

Figure 6:
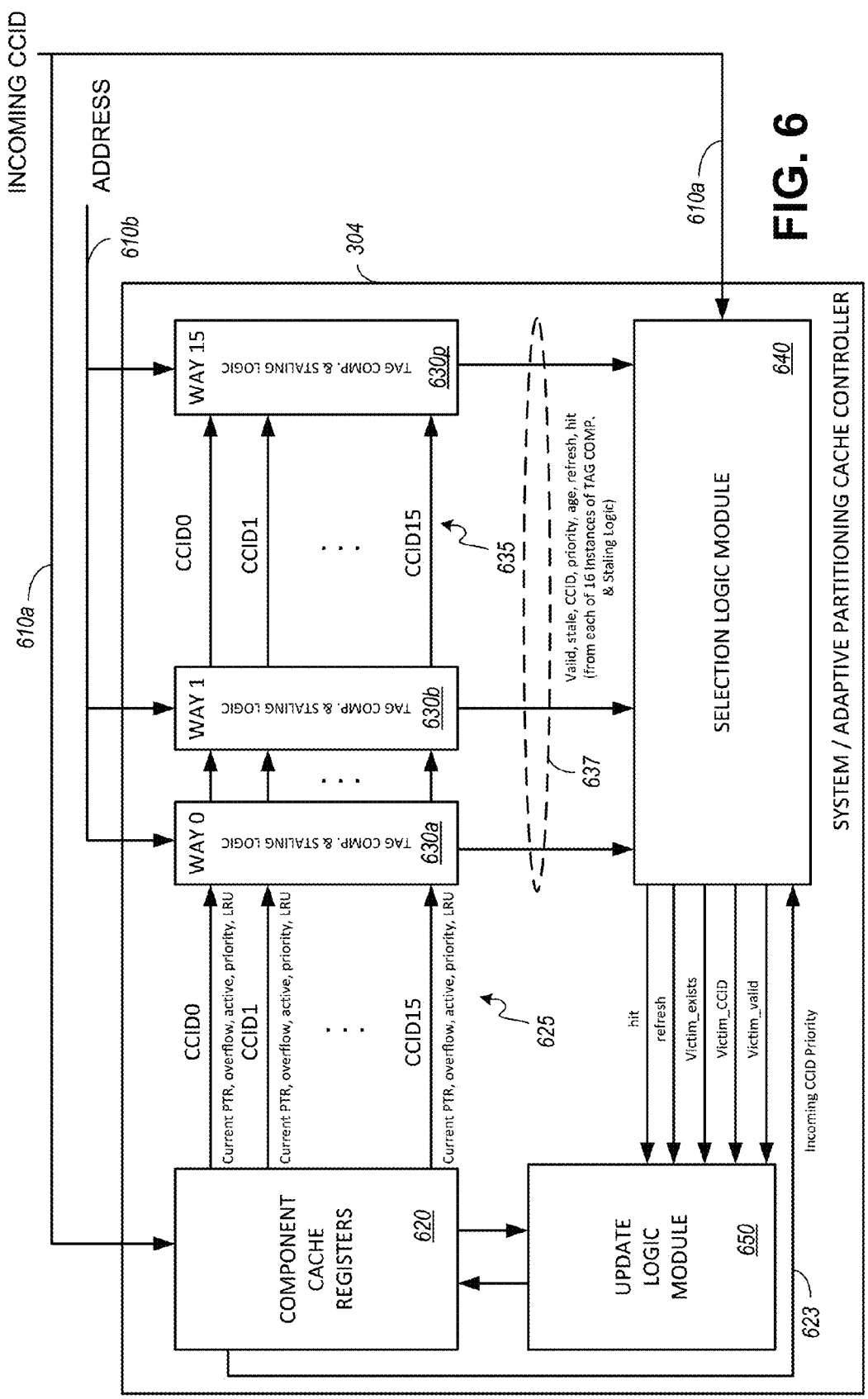
FIG. 6 is a schematic diagram illustrating components of the shared cache controller of FIG. 5.

FIG. 6 is a schematic diagram illustrating components of the system cache controller 304 of FIG. 5 that enable adaptive partitioning of a system cache 302 in communication with the system cache controller 304. Conventional buffers and logic circuits for enabling communications between the various processors on the SoC 12 and the system cache 302 are well known by those having ordinary skill in the art. These conventional elements are omitted for ease of illustration and description of the adaptive partitioning cache controller and related functions.

The system cache controller 304, which in the illustrated embodiment is an adaptive partitioning cache controller, includes an input/output (I/O) port 610 coupled to the communication bus that connects memory interface 316, memory controller 320 and protocol converter 308 to the system cache controller 304. Cache initialization and allocation requests are received on the communication bus 610 from an executing thread or process on an execution resource in the CPU cluster 306, camera subsystem 318, video subsystem 320, display subsystem 322, GPU 310, modem DSP 312 or application DSP 314. As illustrated, I/O port connections 610a communicate an incoming CCID to both the component cache registers 620 and the selection logic module 640. The update logic module 650 receives the incoming CCID from the component cache registers 620. In an alternative embodiment (not shown), the update logic module 650 may be arranged with dedicated connections to receive the incoming CCID. In addition to the incoming CCID, a cache address is communicated along connections 610b to the tag comparison and staling logic module 630. As indicated in FIG. 6, there is an instance of the tag comparison and staling logic module 630 for each identified way in the shared or system cache 302.

As indicated in FIG. 6, the I/O port 610 of the adaptive partitioning cache controller 304 receives an address and an associated component cache identifier or CCID for the incoming transaction. The CCID is communicated to a set of component cache registers 620 and update logic module 650. The component cache registers 620 include storage locations for cache configuration parameters, component cache occupancy parameters and bucket parameters.

Example component cache parameters are presented in Table 1. An important aspect of the adaptive partitioning cache controller is the capability to define different behavior for different component caches in the shared cache 302 through the settings of parameters such as those defined in Table 1. New properties can be added and old properties can be adjusted for each component cache as may be desired without impacting the component cache client or the SOC infrastructure. Example component cache occupancy parameters are included in Table 2. Example bucket or timing parameters are presented in Table 3. The address identifying a portion of the system cache 302 is forwarded to tag comparison and staling logic module 630 and the selection logic module 640. The tag comparison and staling logic module 630 associates or applies tag information to each cache line stored in the system cache 302. Example tag information is presented in Table 4.

TABLE 1

| Field | Width | Operation | Description |
|---|---|---|---|
| Active | 1 | Write | Asserted when cache is active |
| Target_occ | 16 | Write | Designated level of bucket capacity in cache lines |
| Priority | 2 | Write | Component cache priority; 3 Level 00 High-01 Mid-11 Low |
| LRU | 1 | Write | Asserted for LRU replacement Deasserted for FIFO replacement |
| Opt_allocate | 1 | Write | When asserted allocation can happen only when component cache is not full |

TABLE 2

| Field | Width | Operation | Description |
|---|---|---|---|
| Current_occ | 16 | Read | Count of allocated cache lines |
| Overflow | 1 | Read | Asserted when Current_occ exceeds target_occ |

TABLE 3

| Field | Width | Operation | Description |
|---|---|---|---|
| Bucket_lvl | 13 | Read | Current bucket level |
| Current_BP | 4 | Read | Current bucket pointer |

TABLE 4

| Field | Width | Description |
|---|---|---|
| CCID | 4 | Component cache identifier |
| BP | 4 | Bucket pointer, there are up to N * M buckets |
| Stale | 1 | Stale cache line |

For each CCID, a set of signals are communicated on bus 625 from the component cache registers 620 to tag comparison and staling logic module 630a. The signals include a current bucket pointer, a priority level, an LRU bit, as well as, overflow and active condition bits. As indicated, the current bucket pointer and priority information is communicated over multiple connections of the bus 625. The tag comparison and staling logic modules 630a-630p use the various inputs to generate a measure of the age or elapsed time that a cache line has been stored in the system cache 302 in order to determine if it is stale or not. Once a cache line is stale, it remains stale and the age calculation has no impact. The only situation where a cache line stale condition can be reversed is when it is accessed on a read hit and the LRU parameter of the associated component cache is true. In addition, the tag comparison and staling logic modules 630a-630p generate hit, refresh, and stale condition bits in response to present conditions in the system cache 302. The refresh and hit status information is forwarded to the update logic module 650.

As further indicated in FIG. 6, valid and stale conditions are communicated along with the component cache priority, component cache identifier and age indicator on a per Way basis along bus 637 to selection logic module 640. Details of an instance of the tag comparison and staling logic module 630 and operation of an embodiment of a staling process are illustrated and described in association with FIG. 7 and FIG. 8, respectively.

As further indicated in FIG. 6, the signals on bus 637 are received by the selection logic module 640, which is arranged to use the priority level, relative age, CCID, as well as the valid and stale condition indicators, to identify victims or candidates for replacement from the system cache 302. As shown in the illustrated embodiment, the selection logic module 640 forwards an identified or victim CCID as well valid victim and victim exists indicators, hit and refresh condition indicators, which are communicated to update logic module 650. The update logic module 650 is arranged to apply the configuration parameters along with the hit and refresh condition indicators received from the tag comparison and staling logic module 630 to update the victim associated component cache and the incoming transaction associated component cache occupancy parameters, including a current bucket level and a current bucket pointer.

Figure 7:
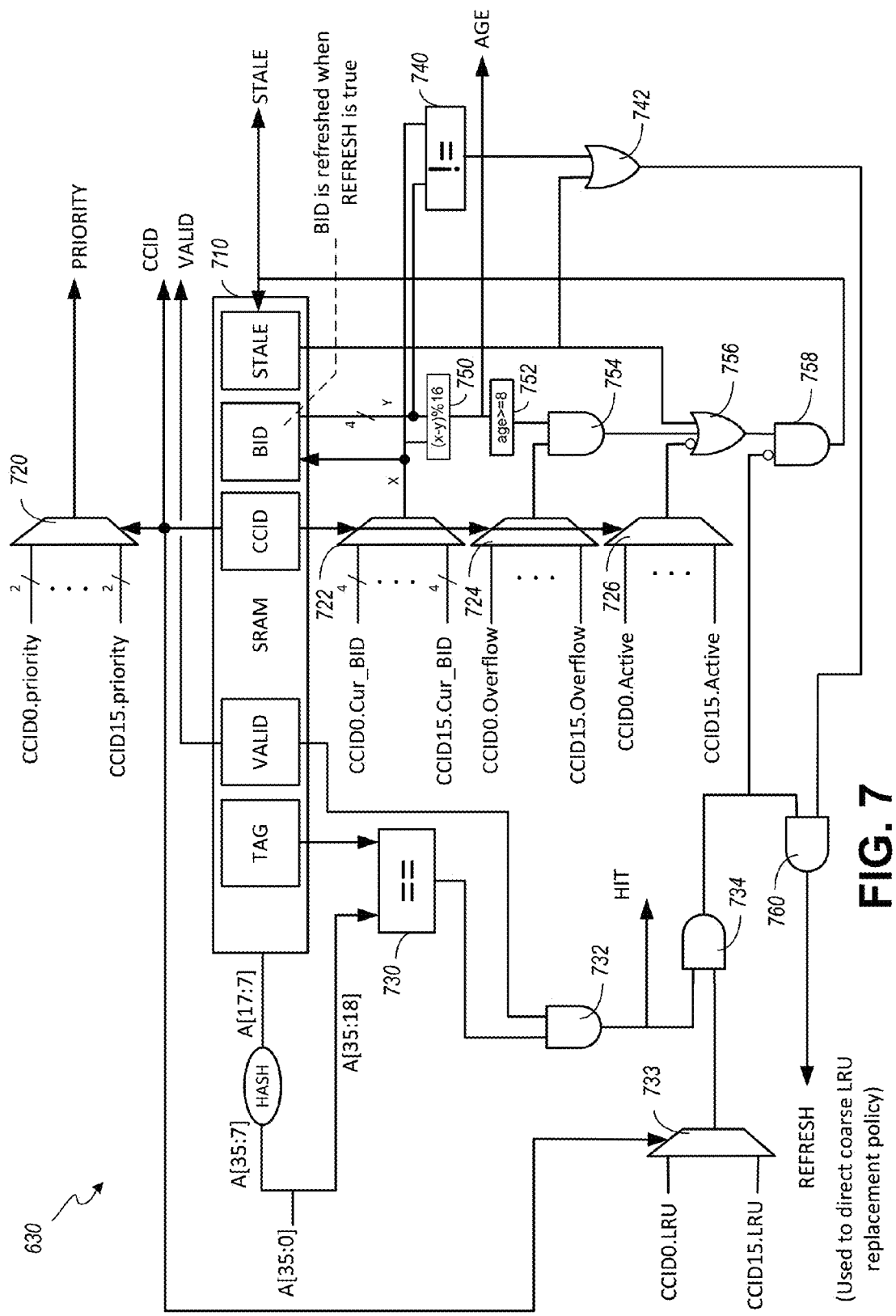
FIG. 7 is a schematic diagram illustrating an example embodiment of the tag comparison and staling logic module of FIG. 6.

FIG. 7 is a schematic diagram illustrating an example embodiment of the tag comparison and staling logic module 630 of FIG. 6. The tag comparison and staling logic module 630 includes a SRAM 710 that stores tag information, a CCID, a bucket pointer or identifier (BID), as well as valid and stale bits for each cache line written to the system cache 302. Multiplexer 720 controllably forwards a priority level based on the CCID. Comparator 730 generates an input to AND gate 732 responsive to tag information and select address bits received from the input/output port 610. A second input to AND gate 732 is responsive to the valid state condition or valid bit stored in SRAM 710. The output of AND gate 732 identifies a HIT condition (i.e., valid data is already in the cache 302).

Multiplexer 722 forwards a current bucket pointer or identifier in response to the component cache identifier stored in SRAM 710. The current bucket identifier is coupled to comparator 740, the BID store in the SRAM 710 and an X input to modulo comparator 750. A previously stored BID in the SRAM 710 is coupled to a Y input of the comparator 740 and the modulo comparator 750. The output of modulo comparator 750 provides a measure of the time that a cache line has been present in the cache or an age. This measure is forwarded to comparator 752, which identifies when the age is greater than or equal to the integer eight. The output of comparator 752 is coupled to a first input of AND gate 754. Multiplexer 724 forwards the present overflow condition status as directed by the CCID to a second input of the AND gate 754. OR gate 756 receives the present stale bit as stored in SRAM 710 the output of AND gate 754 and an inverted version of the present active status as forwarded by multiplexer 726, which also operates in accordance with the active indicator for each respective CCID. When a cache component is de-activated (by de-asserting the active indicator) then all cache lines associated with the cache component becomes stale. The output of OR gate 756 is coupled to a first input of AND gate 758.

AND gate 734 receives the HIT status signal from the output of AND gate 732 and further receives information concerning an operational mode of the presently identified component cache at a second input of AND gate 734. As illustrated in FIG. 7, multiplexer 733 controllably forwards a signal identifying when the corresponding component cache is operating in a least recently used or LRU mode of operation. The output of AND gate 734 is coupled to an inverted input of AND gate 758 and a first input of AND gate 760. The output of AND gate 758 controllably updates the stale condition or stale bit stored in SRAM 710. Comparator 740 identifies when the current bucket pointer forwarded from multiplexer 722 is not equal to the bucket pointer stored in SRAM 710. The output of comparator 740 is coupled to a first input of the OR gate 742. A second input to the OR gate 742 is coupled to the stale bit indicator in SRAM 710. When either the bucket pointers do not match or when the stale bit or condition is asserted, the OR gate 742 will send a logic high to the second input of AND gate 760, which generates a refresh condition signal. As indicated in the label, the bucket pointer stored in SRAM 710 is refreshed or updated when the refresh condition signal is true.

Figure 8:
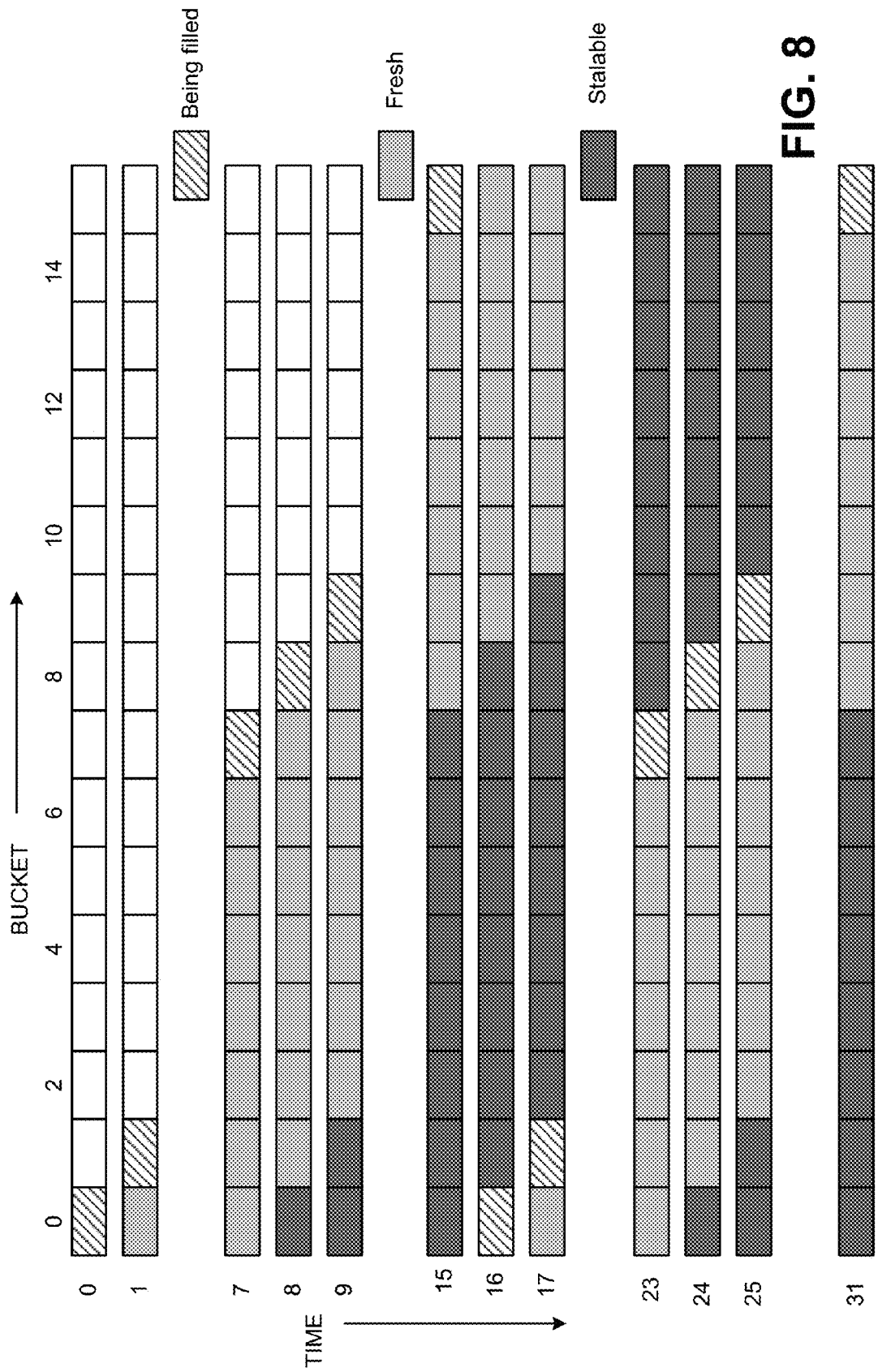
FIG. 8 is a timing diagram illustrating an example embodiment of a staling process implemented by the staling logic module and update logic module of FIG. 7.

FIG. 8 is a timing diagram illustrating an example embodiment of a staling process implemented by the update logic module of FIG. 7. In accordance with a staling process, the first allocated cache lines are assigned to first bucket (e.g., bucket 0). When a quantity of the allocated cache lines is equal to a select fraction of the target occupancy, subsequent allocated cache lines are assigned to a next bucket (e.g., bucket 1). This process continues as the system cache 302 is being populated by data. When a quantity of the allocated cache lines is equal to the target occupancy, subsequent cache lines will be assigned to the next bucket and cache lines in the first bucket can be "staled." When new or fresh cache lines are being assigned to a next subsequent bucket pointer, the cache lines stored with a second bucket can be staled. A current bucket is defined as the bucket in which incoming allocations are being assigned. In a steady state, a bucket pointer K will vary in accordance with $0 \leq K \leq 15$, when bucket pointers 0 through 15 are used.

An incoming cache line is assigned to bucket K. Both the bucket pointer K and the CCID are stored with tag information describing a condition in the shared cache 302 in a storage location in the adaptive partitioning cache controller 304. In the illustrated embodiment, N=8, M=2 and 16 is the total number of buckets being used by the cache controller 304. The variable N is an integer representing the number of fresh buckets in a component cache. Under these circumstances, any cache line in a bucket with pointer equal to X can be staled when (K−X) %16>=N (where % is representative of a modulo operation).

When bucket K has been assigned a quantity of cache lines equal to $1/N^{th}$ of the component cache target occupancy, the current bucket pointer is incremented by setting the bucket pointer to (K+1)%16. As indicated, the staling process marks candidates for replacement. When a conflict miss occurs, a replacement candidate is chosen among the stale cache lines regardless of the component cache with which the stale cache lines have been associated. If no stale cache line candidates exist, a replacement candidate is chosen in accordance with a priority scheme depending on the component cache parameters. Upon each cache access, all valid cache lines in the set are checked for a stale bit or an indication of a stale condition. The bucket ID X of a cache line being checked is compared to a current bucket pointer K of the component cache that the cache line was assigned to. If the distance (K−X) %16 is greater than or equal to 8, then the cache line is marked stale. Under two conditions the result of the comparison is ignored. In a first, a stale cache line will remain stale whatever the result of the comparison. In a second, only cache lines belonging to an overflowed component cache are staled. A cache line is marked stale if the Set the cache line is assigned to is touched or accessed. Thus, staling intensity or frequency will depend on cache activity.

In the illustrated timing diagram of FIG. 8, there are 16 buckets identified across the abscissa by bucket pointers 0 through 15. A bucket contains cache lines with the same bucket pointer. As described, each bucket is filled with a target capacity/8 cache lines, where "I" is the division operator. For a newly activated cache, as indicated in Set 0 which increases in time with each Set number down the ordinate, allocated cache lines are presently filled in bucket 0. As also described, once the occupancy of bucket 0 reaches $1/8^{th}$ of the target occupancy for that bucket, subsequent cache lines are assigned to bucket 1 and cache lines in bucket 0 are considered fresh. This accretion or growth continues until bucket 7 reaches a current occupancy that is $1/8^{th}$ of the target occupancy for bucket 7. At that point, cache lines in buckets 1 through 7 are considered fresh, subsequent allocations are assigned to bucket 8 and cache lines in bucket 0 can be staled. When bucket 8 reaches $1/8^{th}$ of its component cache target occupancy, cache lines in buckets 2 through 8 are considered fresh, subsequent allocations are assigned to bucket 9 and cache lines in bucket 0 and bucket 1 can be staled. When the cache has been active long enough and received enough activity to have filled bucket 15 to $1/8^{th}$ of its target occupancy, a cache line in bucket 0 that has not been staled is becoming fresh. Newly allocated cache lines may be assigned to bucket 0 and cache lines in bucket 1 through bucket 8 can be staled. When this is the case, cache lines in bucket 0 and bucket 9 through bucket 15 are considered fresh. When bucket 0 reaches $1/8^{th}$ of the target occupancy, subsequent cache lines are assigned to bucket 1 and cache lines in bucket 2 through bucket 9 can be staled. When this is the case, cache lines in bucket 0, bucket 1, and bucket 10 through bucket 15 are considered fresh.

The above described method can be generalized to an array of N*M buckets where there are N fresh buckets and (N−1)*M stale buckets, where N and M are integers. In a steady state the relationships are such that for a current bucket K, $0 \leq K \leq (N*M-1)$, a cache line in a bucket ID X can be staled when (K−X) % (N*M)>=N. When a bucket K has been assigned a quantity of cache lines equal to $1/N^{th}$ of the component cache target occupancy, the current bucket pointer is set to (K+1)% (N*M). Simulations show that N=8 and M=2 provide excellent performance and larger values would marginally improve performance at the expense of more memory to store the bucket pointer information with each cache line.

Figure 9:
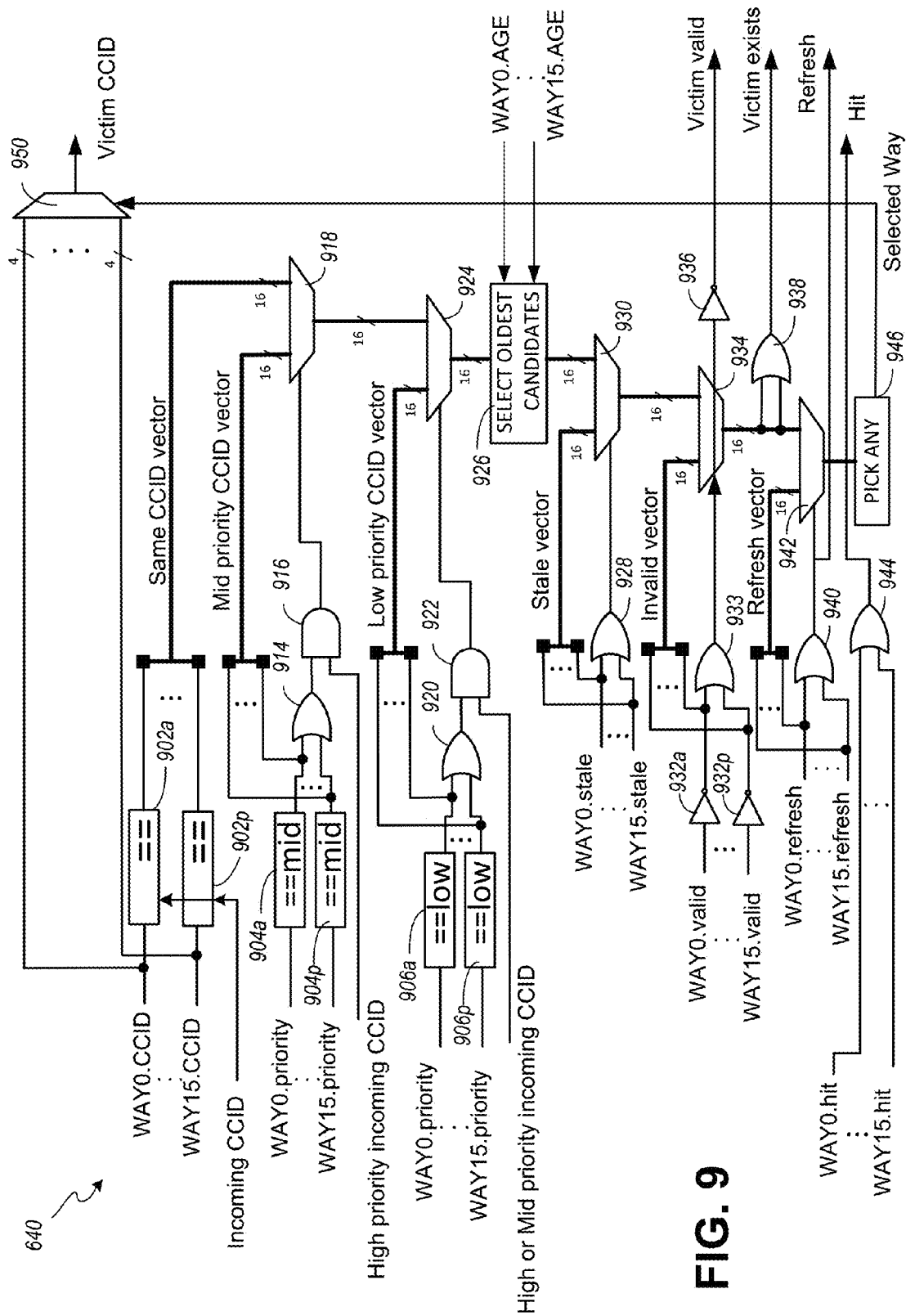
FIG. 9 is a schematic diagram illustrating an example embodiment of the selection logic module of FIG. 6.

FIG. 9 is a schematic diagram illustrating an example embodiment of the selection logic module 640 of FIG. 6. The selection logic module 640 receives the CCID, the priority identifier bits and the measure of time or age that a select cache line has been in the system cache 302, as well as stale, valid, refresh and hit status indicators for each candidate cache line. In response, the selection logic module 640 conditionally generates or identifies a victim cache line, as well as control signals responsive to whether the identified victim exists and is valid. The CCID communicated from the tag comparison and staling logic module 630 is applied to the multiplexer 950 and to comparators 902*a*-902*p*. The comparators 902*a*-902*p* further receive an incoming CCID associated with an incoming transaction and identify when a match exists, which information vector labeled "Same CCID vector" is forwarded to a first set of inputs of multiplexer 918.

Comparators 904*a*-904*p* are arranged to receive the priority information forwarded from the tag comparison and staling logic module 630 and provide respective output signals when a mid-level of the three levels of priority is present. The resulting information vector labeled "Mid priority CCID vector" is forwarded to the second set of inputs of multiplexer 918. OR logic gate 914 forwards a logic high signal when a CCID with a mid-level priority exists to a first input of the AND gate 916. When an incoming CCID has a high priority, as represented by an asserted signal on the connection labeled "High priority incoming CCID," at the second input of the AND gate 916, the output of AND gate 916 is asserted which directs the multiplexer 918 to forward the mid-level priority CCID vector to its output. Otherwise, when the output of the AND gate 916 is not a logic high the multiplexer 918 forwards the same CCID information vector to its output. The output of multiplexer 918 is forwarded to a first set of inputs of multiplexer 924.

Comparators 906*a*-906*p* are arranged to receive the priority information forwarded from the tag comparison and staling logic module 630 and provide respective output signals when a low-level of the three levels of priority is present at the output of the comparators 906*a*-906*p*. The resulting information vector labeled "Low-priority CCID vector" is forwarded to the second set of inputs of multiplexer 924. OR logic gate 920 forwards a logic high signal when a CCID with the low-level priority exists to a first input of the AND gate 922. When an incoming CCID has a mid or low priority, as represented by an asserted signal on the connection labeled "High- or Mid-incoming CCID priority" at the second input of the AND gate 922, the output of AND gate 922 directs the multiplexer 924 to forward the low-level priority CCID vector to its output. Otherwise, when the output of AND gate 922 is not asserted, the multiplexer 924 forwards the output of multiplexer 924 to its output, which is connected to the input of the select oldest candidate logic module 926.

The select oldest candidate logic module 926 further receives an age value from the respective tag comparison and staling logic module 630 on the age indicator inputs and uses that respective age information to determine which of the selected cache line candidates as received from multiplexer 924 are the oldest. A result information vector is forwarded to the first set of inputs of the multiplexer 930.

All stale candidates identified by the vector labeled "Stale vector" are communicated to the inputs of OR gate 928 and to the second set of inputs of multiplexer 930, which is forwarded to the output of multiplexer 930 when at least one of the Way-based stale indicators is asserted, as controlled by the output of OR gate 928. Otherwise, when no candidates are identified as stale, the multiplexer 930 forwards the result information vector identifying the oldest cache line information to the first set of inputs of multiplexer 934.

Each of the Way-based valid indicators received from the tag comparison and staling logic module are applied at an input of a respective inverter 932*a*-932*p*. The respective outputs of the inverters 932 are applied at the inputs of OR gate 933 and provide the "Invalid vector" which is applied to the second set of inputs of multiplexer 934. The OR gate 933 identifies when any of the candidates are invalid and when this is the case, forwards candidates received at the second set of inputs of multiplexer 934 to its output. Otherwise, when no candidates are identified as invalid, the output of OR gate 938 directs the multiplexer 934 to forward to its output the output of multiplexer 930. The output of multiplexer 934 is forwarded to the first set of inputs of multiplexer 942.

Each of the Way-based refresh indicators received from the tag comparison and staling logic module are applied at the inputs of OR gate 940. The output of OR gate 940 is connected to a control input of the multiplexer 942 and provides a refresh output signal that is forwarded to the update logic module 650. When a refresh signal is asserted, the refresh information vector labeled "Refresh vector" received at the first set of inputs of the multiplexer 942 are forwarded to the inputs of pick any logic module 946. Otherwise, when no refresh signal is asserted, the multiplexer 942 forwards the output of multiplexer 934 to the pick any logic module 946. In a preferred embodiment, the pick any logic module 946 selects the left-most Way with a selected candidate, which is applied to the control input of multiplexer 950. When a refresh condition is asserted, the victim CCID at the output of multiplexor 950 corresponds to the CCID of the cache line that was addressed. The refresh condition instructs the update logic 650 to update the bucket parameters.

As further indicated in FIG. 9, each of the Way-based hit condition indicators received from the tag comparison and staling logic module 630 are applied at the inputs of OR gate 944. The output of OR gate 944 provides a hit condition output signal that is forwarded to the update logic module 650.

Figure 10:
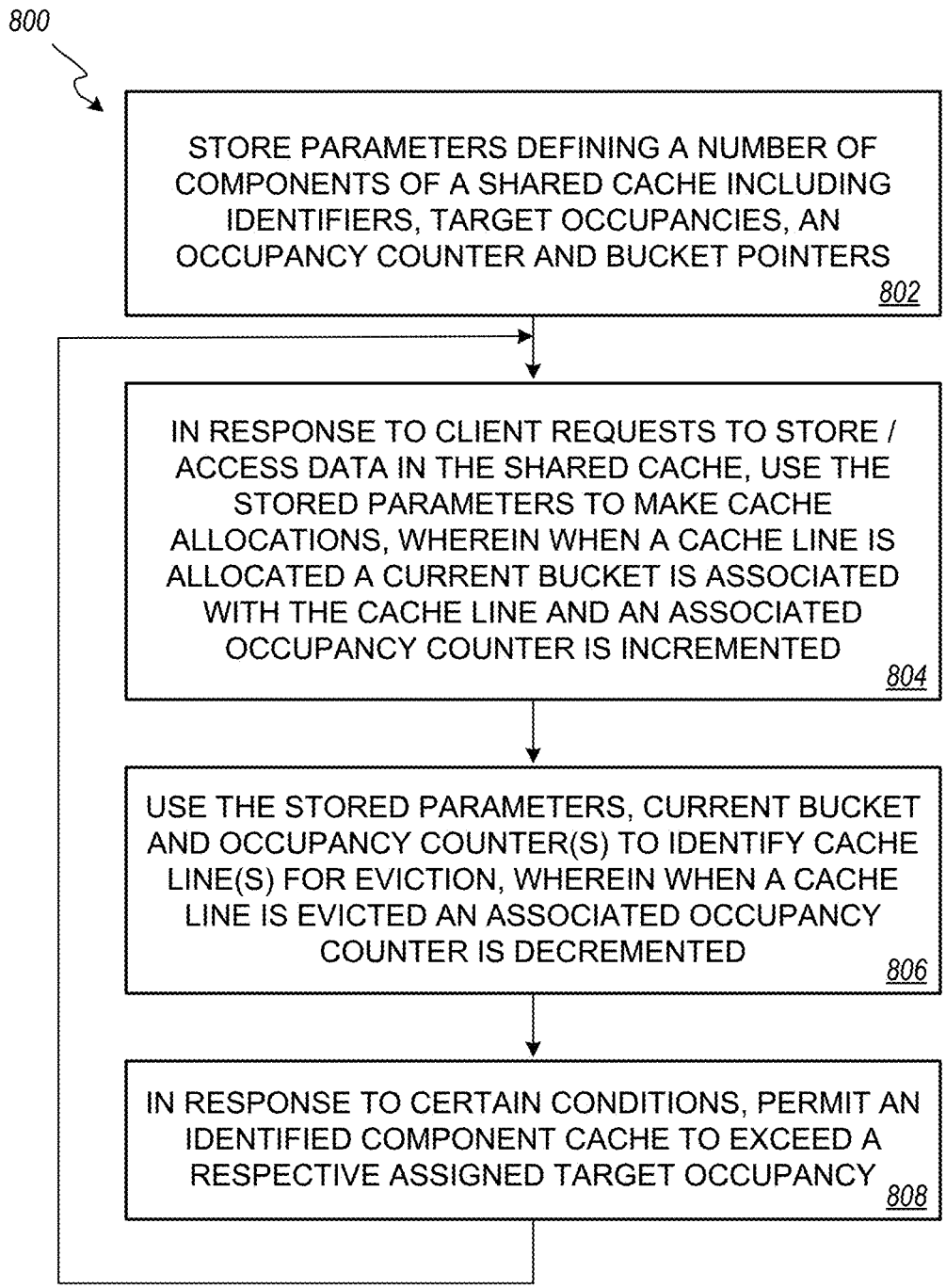
FIG. 10 is a flow diagram illustrating an example embodiment of a method for adaptively partitioning a shared cache.

FIG. 10 is a flow diagram illustrating an example embodiment of a method 800 for adaptively partitioning a shared or system cache 302. The method 800 begins with block 802 where parameters defining a select number of components of a shared cache including identifiers, target occupancies, an occupancy counter and bucket pointers are stored such as in a set of component cache registers 620 and/or a synchronous random access memory. As shown in block 804, when system cache requests are received from various clients of the shared cache 302, an adaptive partitioning cache controller 304 uses the stored parameters and present cache conditions to make cache allocations. When a cache line is allocated, a bucket pointer is associated with the cache line and an occupancy counter is incremented. Concurrently, or as soon as practical thereafter, as indicated in block 806, the adaptive partitioning cache controller 304 uses the stored current bucket pointer and occupancy counter to identify cache lines for possible eviction from the cache. As further indicated in block 806, when a cache line is evicted or removed from the cache an associated occupancy counter is decremented. As shown in block 808, under certain conditions the adaptive partitioning cache controller 304 permits an identified component cache to exceed a respective assigned target occupancy.

Figure 11:
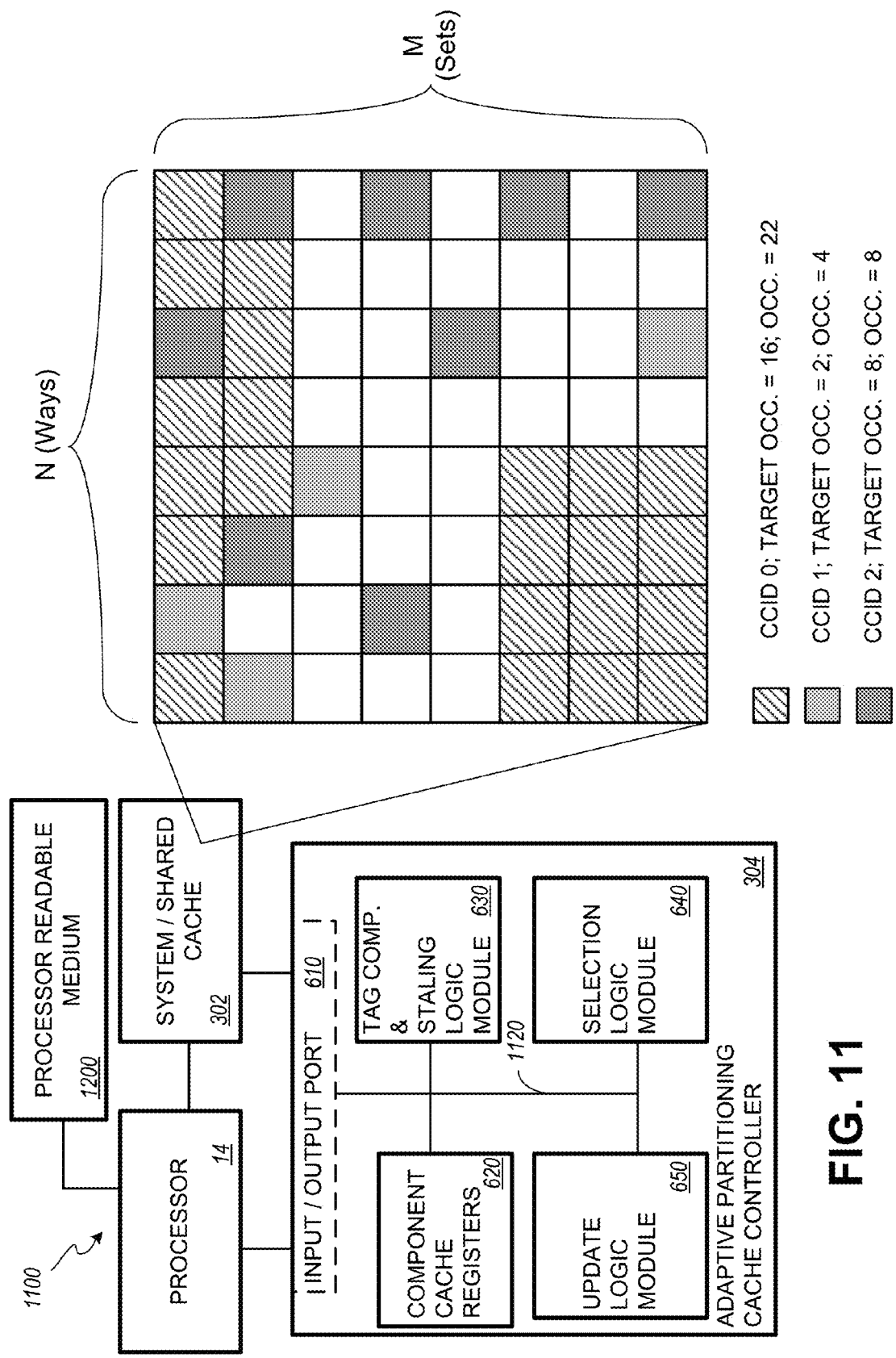
FIG. 11 is a schematic diagram illustrating an example embodiment of a computing device.

FIG. 11 is a schematic diagram illustrating an example embodiment of a computing device 1100. In the illustrated embodiment, the computing device 1100 includes processor 14 which is communicatively coupled to a processor readable medium 1200, system or shared cache 302, and an adaptive partitioning cache controller 304. The adaptive partitioning cache controller 304 communicates with the processor 14 and the system or shared cache 302 via input/output port 610 and bus 1120. As further shown in FIG. 11, the adaptive partitioning cache controller 304 includes component cache registers 620 for storing configuration parameters, timing parameters, and occupancy parameters. The information stored in the component cache registers 620 is forwarded and refreshed in accordance with signals communicated on bus 1120. Tag comparison and staling logic module 630 receives the information stored in the component cache registers 620 as well as address information from a client request communicated from the processor 14. The tag comparison and staling logic module 630 forwards a set of signals per way to the selection logic module 640 which identifies one or more stale partitions for removal from the shared cache 302. The tag comparison and staling logic module 630 also generates and communicates refresh and hit signals to the update logic module 650. The update logic module 650 uses these signals and status information regarding potential victims for removal to update information in the component cache registers 620 and upon select conditions removes cache lines from the shared cache 302 and/or adjusts partitions in the shared cache 302.

The computing device 1100 when arranged with the adaptive partitioning cache controller 304, as illustrated and described, is capable of partitioning the system shared cache 302 such that the separate partitions are independent of Set & Way structures. As shown in the illustrated embodiment, the system shared cache 302 includes three identified component caches. A first component cache identifier CCID 0 has a target occupancy of 16 cache lines but has taken advantage of present cache conditions and the workload on the computing device 1100 to presently occupy 22 cache lines. A second component cache identifier CCID 1 has a target occupancy of 2 but has taken advantage of present cache conditions and the workload on the computing device 1100 to occupy 4 cache lines of the set of available cache lines. In addition, a third component cache identifier CCID 2 has a target occupancy of eight cache lines and is presently using eight cache lines.

Figure 12:
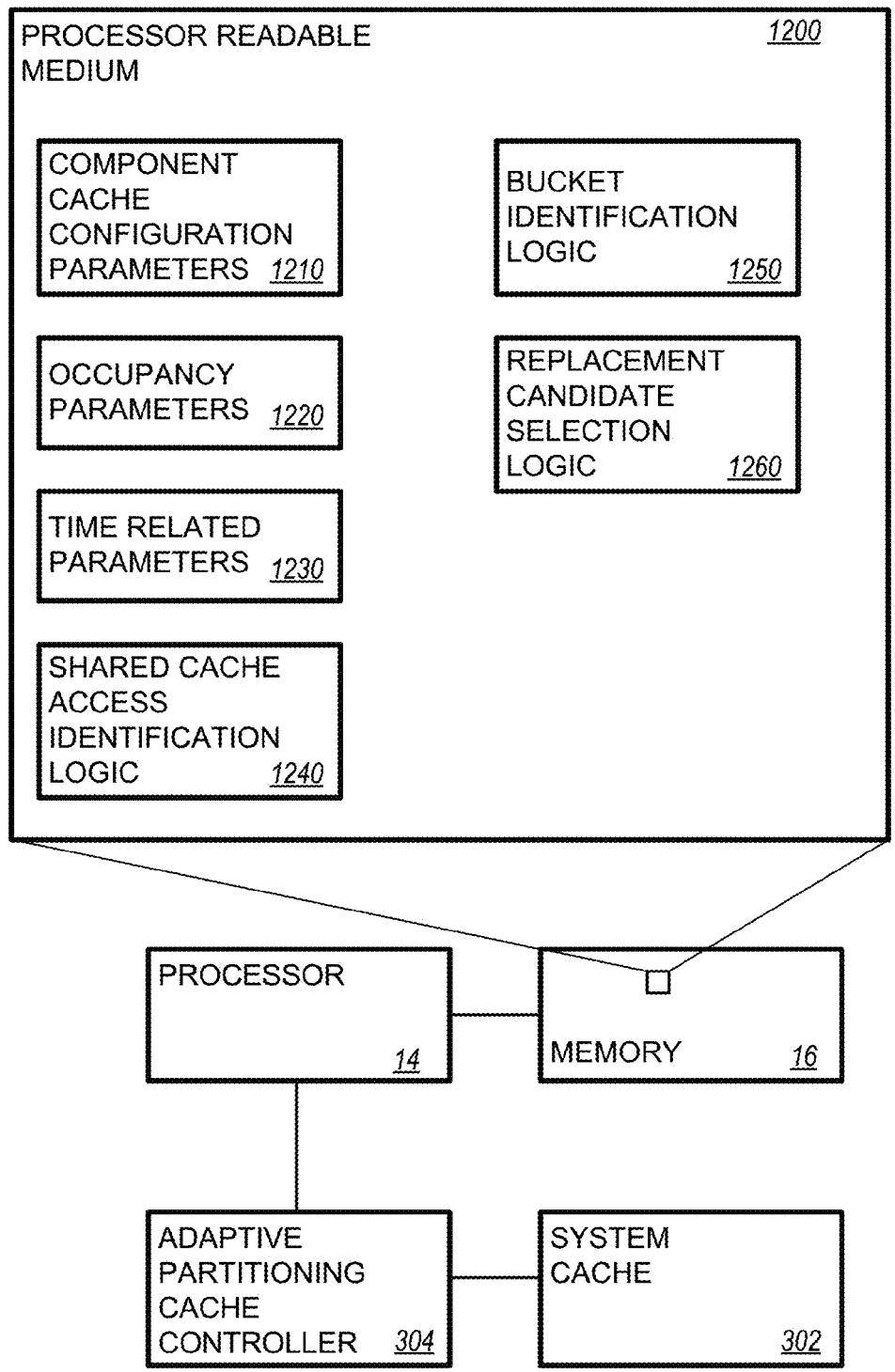
FIG. 12 is a schematic diagram illustrating a computing device including an example embodiment of a processor-readable medium.

FIG. 12 is a schematic diagram illustrating an example embodiment of a processor readable medium 1200 stored in a memory 16 in a computing device. As indicated, the processor readable medium 1200 includes storage locations and logic modules or collections of executable instructions that when executed by the processor 14, perform the various steps associated with the described staling, updating and selection processes for adaptively partitioning and managing a shared or system cache 302. As indicated in the illustrated embodiment, the storage locations include component cache configuration parameters 1210, occupancy parameters 1220, and time-related parameters 1230. As also indicated, the logic modules include a shared cache access identification logic 1240, bucket identification logic 1250 and replacement candidate selection logic 1260. The shared cache access identification logic 1240 identifies client cache requests. Bucket processing logic 1250 assigns bucket pointers to cache lines and keeps track of present component cache occupancy and a measure of the time a cache line has been present in the cache. The replacement candidate selection logic 1260, in response to operating parameters and usage of the cache, identifies one or more candidates in a prioritized scheme for removal from the cache. As described, the bucket identification logic 1250 and the replacement candidate selection logic 1260 will store updated information in the occupancy parameter store 1220 and time related parameter store 1230.

Certain steps in the processes or process flows described in this specification naturally precede others for the computing device to function as described. However, the computing device and described methods are not limited to the order of the steps described if such order or sequence does not alter the described functionality. That is, it is recognized that some steps may performed before, after, or in parallel (substantially simultaneously) with other steps without departing from the scope of the claimed computing device and methods. In some instances, certain steps may be omitted or not performed. Further, words such as "thereafter", "then", "next", "subsequently", etc. are not intended to limit the order of the steps. These words are simply used to guide the reader through the description of the exemplary method.

Additionally, one of ordinary skill in energy management within a portable, desktop, or server computing device is able to identify appropriate hardware and/or circuits and/or identify appropriate logic and determinations to implement the disclosed embodiments without difficulty based on this specification. Therefore, disclosure of a particular set of program code instructions, decision thresholds or detailed hardware devices is not considered necessary for an adequate understanding of how to make and use the disclosed computing devices and operating methods. The inventive functionality and aspects of the claimed processor-enabled processes and circuit architectures are explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored as one or more instructions or code on a computer-readable medium, such as a non-transitory processor-readable medium. Computer-readable media include data storage media.

A storage media may be any available media that may be accessed by a computer or a processor. By way of example, and not limitation, such computer-readable media may comprise RAM, magneto-resistive RAM (MRAM), ROM, EEPROM, NAND Flash, NOR Flash, spin-torque MRAM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the present systems and methods, as defined by the following claims.

What is claimed is:

1. A method for adaptively partitioning a shared cache, comprising:

storing parameters that define aspects of an integer number of component caches in the shared cache, wherein at least one of the integer number of component caches is associated to a set of parameters including a target occupancy and an occupancy counter;

applying, to client requests, a unique identifier corresponding to a component cache within the integer number of component caches;

in response to the client requests to store client data in the shared cache, using information stored in the set of parameters to make cache line allocations, wherein when a cache line is allocated an associated occupancy counter is incremented; and using the information stored in the set of parameters to identify candidate cache lines for eviction, wherein when a separate cache line is evicted the associated occupancy counter is decremented.

2. The method of claim 1, further comprising:
assigning an active indicator to the at least one of the integer number of component caches, wherein cache lines present in the shared cache are associated by default with a stale condition when their respective component cache has the active indicator de-asserted.

3. The method of claim 2, further comprising:
assigning a bucket pointer and a bucket level counter to the at least one of the integer number of component caches, wherein the at least one of the integer number of component caches is divided into an integer number of buckets; and for each cache line allocation that addresses the at least one of the integer number of component caches,
incrementing a bucket level value in the bucket level counter for the at least one of the integer number of component caches,
when the bucket level value reaches a fixed fraction of the target occupancy for the at least one of the integer number of component caches, incrementing the bucket pointer and resetting the bucket level counter; and
storing the bucket pointer in the shared cache in association with an allocated cache line.

4. The method of claim 3, further comprising:
for access operations that address the at least one of the integer number of component caches, identifying a set of candidate cache lines for replacement; and
for each candidate cache lines of the set of candidate cache lines, calculating an age by comparing the value of the bucket pointer associated with a particular candidate cache line with a current bucket pointer value for the component cache associated with the particular candidate cache line.

5. The method of claim 4, further comprising:
for each of the candidate cache line, determining a stale condition depending on the respective age, and
storing the stale condition in the shared cache in association with the particular candidate cache line.

6. The method of claim 4, wherein the set of parameters includes a least recently used parameter that conditionally identifies when a cache line from an older bucket should be moved to the current bucket.

7. The method of claim 5, further comprising:
for a component cache access that results in a hit condition, conditionally updating the bucket pointer and stale condition for the accessed cache line, and conditionally updating the bucket level value for the component cache.

8. The method of claim 7, wherein the bucket pointer is refreshed, the stale condition is reset and the bucket level value is incremented when the component cache least recently used parameter is set and the bucket pointer is not equal to the component cache current bucket pointer.

9. The method of claim 2, further comprising:
for a component cache access that results in a miss condition, conditionally identifying a replacement candidate.

10. The method of claim 9, further comprising:
assigning a priority parameter to the at least one of the integer number of component caches; and
conditionally identifying the replacement candidate when no stale candidates exist.

11. The method of claim 10, wherein the replacement candidate is selected in a preferred sequence including from among any stale cache lines, from the lowest priority cache line with a lower priority than an accessed cache component, from the accessed cache component, and when multiple fresh replacement candidates are identified, from an oldest cache line.

12. The method of claim 11, further comprising:
when multiple replacement candidates are identified, applying an additional replacement candidate criteria.

13. The method of claim 12, wherein the additional replacement candidate criteria includes identifying a default way.

14. The method of claim 1, further comprising:
assigning an optional allocate parameter to the at least one of the integer number of component caches; and
conditionally allocating a cache line.

15. The method of claim 14, wherein a cache line is not allocated when the respective component cache is full and the optional allocate parameter is set.

16. An adaptive partitioning cache controller, comprising:
registers arranged to store a set of operational parameters for a desired number of component caches of a shared cache;
tag comparison and staling logic coupled to the registers and arranged to receive a cache address and a unique component cache identifier identifying a cache line in the shared cache, the tag comparison and staling logic in response to an operational mode input generates a measure of elapsed time that information has been stored in a particular cache line in the shared cache, conditionally records a stale condition, a valid condition and updates a bucket pointer; and
selection logic coupled to the tag comparison and staling logic and the registers, the selection logic arranged to receive the measure of elapsed time that the information has been stored in the particular cache line in the shared cache, the unique component cache identifier, and a priority indicator, and identify in accordance with the stale condition and the valid condition a component cache identifier of a candidate cache line to be replaced in the shared cache.

17. The adaptive partitioning cache controller of claim 16, wherein the set of operational parameters include a target occupancy and a current occupancy.

18. The adaptive partitioning cache controller of claim 17, wherein the set of operational parameters include an active indicator and cache lines present in the shared cache are associated by default with the stale condition when their respective component cache has the active indicator de-asserted.

19. The adaptive partitioning cache controller of claim 18, wherein the set of operational parameters include one or more of a priority value, a current bucket pointer, a current bucket level and a least recently used parameter.

20. The adaptive partitioning cache controller of claim 16, wherein the selection logic is arranged to enable a preferred sequence including identification of a replacement candidate from among any stale cache lines, from the lowest priority cache line with a lower priority than an accessed cache component, from the accessed cache component, and when multiple fresh replacement candidates are identified, from an oldest cache line.

21. The adaptive partitioning cache controller of claim 16, wherein the selection logic is arranged to identify replacement candidates in accordance with at least three levels of priority.

22. A computing device, comprising:
- a processor;
- a shared cache configured to provide a data storage resource for the processor;
- an adaptive partitioning cache controller communicatively coupled to the processor and the shared cache, the adaptive partitioning cache controller, further comprising:
- an input port arranged to receive a cache access request from a client;
- registers arranged to store a set of operational parameters for a desired number of component caches of the shared cache;
- tag comparison and staling logic coupled to the registers and arranged to generate a measure of elapsed time that information has been stored in a particular cache line in the shared cache, record a stale condition, and conditionally update a bucket pointer; and
- selection logic coupled to the tag comparison and staling logic and the registers, the selection logic arranged to conditionally identify a replacement candidate to be replaced in the shared cache.

23. The computing device of claim 22, wherein the registers are arranged to store a target occupancy and a current occupancy.

24. The computing device of claim 22, wherein the registers are arranged to store configuration parameters, occupancy parameters and time related parameters.

25. The computing device of claim 24, wherein the time related parameters include a current bucket pointer and a bucket level.

26. The computing device of claim 24, wherein the occupancy parameters include a current occupancy and an overflow bit.

27. The computing device of claim 24, wherein the configuration parameters are selected from a group consisting of a target occupancy, a priority level, an active bit, a least recently used parameter and an optional allocate parameter.

28. A non-transitory processor-readable medium having stored thereon processor-executable instructions that when executed direct a processor and an adaptive partitioning cache controller to perform operations, comprising:
- defining cache parameters including a unique identifier of a component cache of a shared cache, a target occupancy of the component cache, an occupancy counter associated with the component cache, and an integer number of bucket pointers, each bucket pointer associated with one of a corresponding integer number of component caches, at least one of the component caches being divided into an integer number of buckets;
- identifying a cache access request to a component cache of the shared cache from a client application;
- generating a measure of elapsed time that information has been stored in a particular cache line in the component cache of the shared cache;
- recording a stale condition in response to the measure of elapsed time;
- conditionally updating a bucket pointer for the cache line, the bucket pointer identifying one of the buckets of the component cache; and
- conditionally identifying a replacement candidate to be replaced in the shared cache.

29. The non-transitory processor-readable medium of claim 28, wherein generating the measure of elapsed time that the information has been stored in the particular cache line of the shared cache is responsive to a bucket level representing a fraction of occupancy of the bucket.

30. The non-transitory processor-readable medium of claim 28, further comprising: defining a set of operational parameters including an active indicator, wherein cache lines present in the shared cache are associated by default with the stale condition when their respective component cache has the active indicator asserted.

* * * * *